Patented Apr. 14, 1936

2,037,112

UNITED STATES PATENT OFFICE 2,037,112

SALTS OF TETRAHYDRO-N-METHYL NICOTINIC ACID-METHYLESTER WITH AMINO-SUBSTITUTED ARSONIC ACIDS

Max Bockmühl and Gustav Ehrhart, Frankfort-on-the-Main, Germany, assignors to Winthrop Chemical Company, Inc., New York, N. Y., a corporation of New York No Drawing. Application June 23, 1934, Serial No. 732,179. In Germany June 7, 1933

4 Claims. (Cl. 260—14)

The present invention relates to the salts of tetrahydro-N-methyl nicotinic acid-methylester with amino-substituted arsonic acids.

As is known the salts of the tetrahydro-N-methyl nicotinic acid-methylester (arecoline) show secondary effects when used in veterinary science inter alia against intestinal worms; these secondary effects consist in strong nausea and eclampsia and often exclude or strongly limit a therapeutic application of the compounds.

Now we have found that the salts of the tetrahydro-N-methyl nicotinic acid-methylester with amino-substituted arsonic acids of the benzene series, for instance, with acyl-aminophenylarsonic acids, possess an at least equal effect as the tetrahydro-N-methyl nicotinic acid-methylester alone, without showing the violent secondary effects. The new compounds are obtained by causing tetrahydro-N-methyl nicotinic acid-methylester or the salts of the base to react with the aromatic arsonic acids or with the salts of the acids.

As suitable mono-acylaminophenylarsonic acids there may, for instance, be used acids of the formula:

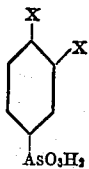

wherein one X stands for the group —NH—R, R being the radical of a lower aliphatic carboxylic acid which may contain a hydroxy group, the other X stands for hydroxyl or hydrogen, such as para-acetylaminophenylarsonic acid, meta-acetylaminophenylarsonic acid, para-acetylamino-meta-hydroxyphenylarsonic acid, para-hydroxy-meta-acetylaminophenylarsonic acid, para-glycolaminophenylarsonic acid, furthermore 1-methyl-benzimidazolone-5-arsonic acid, 2- amino -3- hydroxy -4- methoxybenzenearsonic acid, and aminophenylarsonic acids with higher fatty acid esters, such as propionyl, butyryl and others, for example the para-butyrylaminophenylarsonic acid. The salts crystallize well; they are colorless powders which are readily soluble in water.

The following examples illustrate the invention, but they are not intended to limit it thereto:

(1) 110 grams of para-hydroxy-meta-acetylaminophenylarsonic acid and 62 grams of tetrahydro-N-methyl nicotinic acid-methylester are dissolved in 200 cc. of water. The whole is evaporated in the vacuum or over sulfuric acid. After some time the new compound begins to crystallize.

(2) 55 grams of para-hydroxy-meta-acetylaminophenylarsonic acid and 31 grams of tetrahydro-N-methyl-nicotinic acid-methylester are dissolved in 20 cc. of water on the water-bath; 150 cc. of absolute alcohol are then added. The salt obtained separates after a prolonged cooling or after inoculation in the form of coarse crystals and melts at 105° C. to 106° C.

We claim:

1. The salts of tetrahydro-N-methyl nicotinic acid-methylester with acylaminoarsonic acids of the benzene series in which the acyl group is the radical of a lower aliphatic carboxylic acid, said salts forming colorless crystals, soluble in water.

2. The salts of tetrahydro-N-methyl nicotinic acid-methylester with compounds of the following formula:

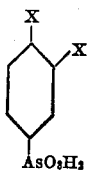

wherein one X stands for the group —NH—R, R being the radical of a lower aliphatic carboxylic acid, the other X stands for hydroxyl or hydrogen, said salts forming colorless crystals, soluble in water.

3. The salts of tetrahydro-N-methyl nicotinic acid-methylester with compounds of the following formula:

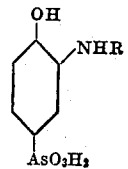

wherein R stands for the radical of a lower aliphatic carboxylic acid, said salts forming colorless crystals, soluble in water.

4. The salt of tetrahydro-N-methyl nicotinic acid-methylester with para-hydroxy-meta-acetylaminobenzene-arsonic acid, said salt forming colorless crystals, soluble in water and melting at 105° C. to 106° C.

MAX BOCKMÜHL.
GUSTAV EHRHART.